United States Patent [19]
Corbett

[11] Patent Number: 4,803,943
[45] Date of Patent: Feb. 14, 1989

[54] FLOATING DOCKS

[76] Inventor: Reg D. Corbett, 23116 Roberts Run, Bay Village, Ohio 44140

[21] Appl. No.: 49,859

[22] Filed: May 15, 1987

[51] Int. Cl.$^4$ ............................................. B63B 35/72
[52] U.S. Cl. .................................... 114/263; 405/219
[58] Field of Search ............... 114/263, 264, 265, 266, 114/267; 405/218, 219, 220

[56] References Cited

U.S. PATENT DOCUMENTS

| | | | |
|---|---|---|---|
| 2,924,191 | 2/1960 | Blumquist et al. | 114/266 |
| 3,073,274 | 1/1963 | Lamb | 114/266 |
| 3,283,517 | 11/1966 | Phillips | 114/266 |
| 3,448,709 | 6/1969 | Hardwick | 114/266 |
| 3,763,808 | 10/1973 | Smith | 114/266 |
| 4,078,515 | 3/1978 | Svirklys | 114/266 |
| 4,223,629 | 9/1980 | Dunlop | 114/263 |
| 4,316,426 | 2/1982 | Meeusen | 114/263 |
| 4,352,597 | 10/1982 | Kay | 114/263 |
| 4,559,891 | 12/1985 | Shorter | 114/263 |

FOREIGN PATENT DOCUMENTS 7705635 11/1977 Netherlands ......................... 114/263

OTHER PUBLICATIONS

Decks and Patios, Ortho Books, Chevron, San Francisco, Ca., 1979, p. 62.

Primary Examiner—Sherman D. Basinger
Assistant Examiner—Stephen P. Avila
Attorney, Agent, or Firm—J. Helen Slough

[57] ABSTRACT

Floating docks units adapted to float freely in water as floating docks for mooring boats, comprising a longitudinal box beam understructure supported by a flotation unit integrally secured to the box beam member. The floating dock unit further contains an upper plank deck comprising a plurality of planks secured diagonally to the longitudinal box beam member. The diagonal planks in combination with the unitary understructure of the box beam integrally secured to the formed metal flotation unit provides substantially increased strength and structural integrity to the floating dock unit.

12 Claims, 2 Drawing Sheets

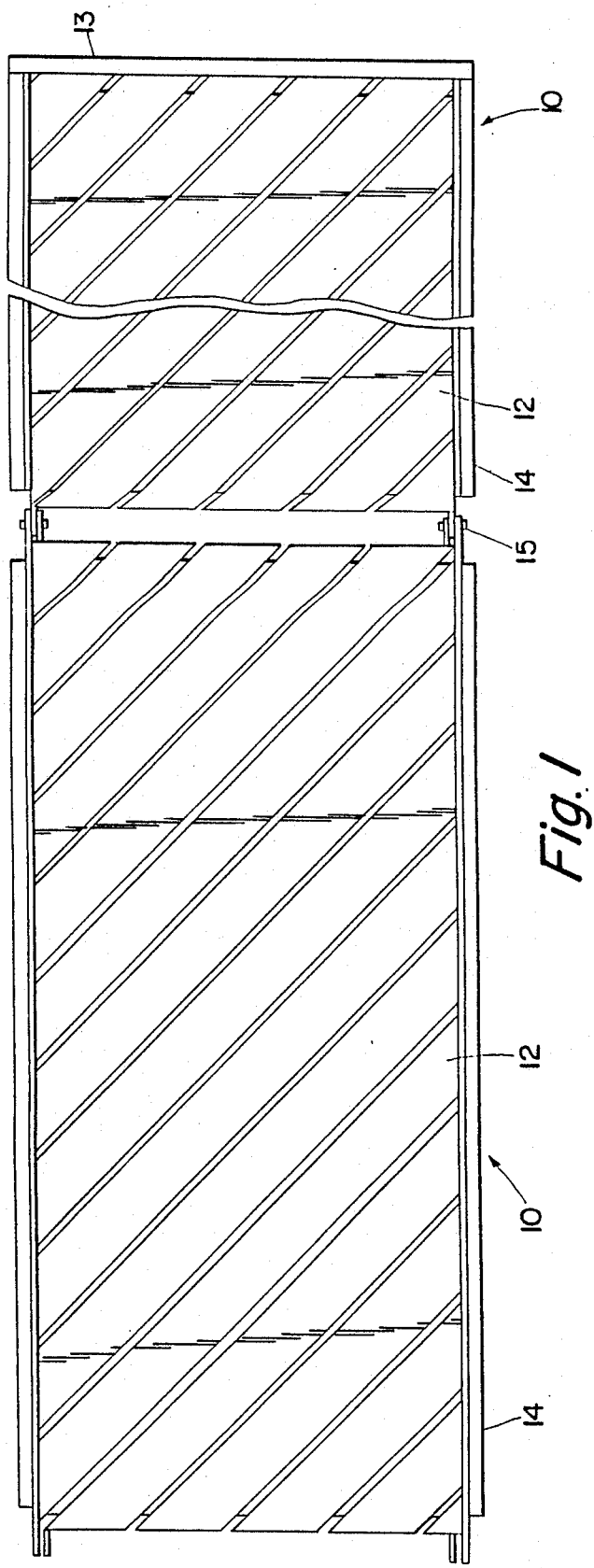
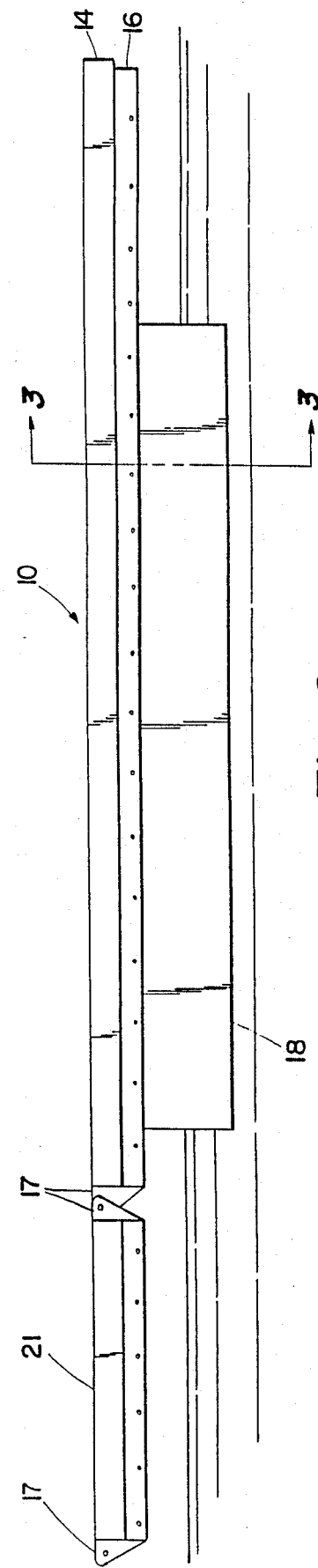

FLOATING DOCKS

BACKGROUND OF THE INVENTION

This invention pertains to a floating dock unit and particularly to an improved integral construction of a floating dock unit achieved by the combined structural reinforcement of the dock understructure integrally secured to the flotation unit in combination with a diagonally secured deck.

Floating docks are known as shown in the following noted patents: U.S. Pat. No. 4,223,629 which discloses a rectangular frame supporting a wood plank decking maintained afloat by blocks of flotation material; U.S. Pat. No. 4,316,426 which discloses longitudinal beams supporting decking consisting of transverse planks; U.S. Pat. No. 3,448,709 which discloses buoyant foam material supporting a lightweight concrete deck; U.S. Pat. No. 3,073,274 which discloses styrafoam floats supporting an understructure beam system and upper deck sections; U.S. Pat. No. 3,763,808 which discloses a floatable, strut reinforced hollow understructure supporting a deck; U.S. Pat. No. 4,078,515 which discloses a deck comprising transverse aluminum channels supported by a combination of beams; U.S. Pat. No. 3,283,517 which discloses a floating dock comprising deck and understructure supported by wheel-like rotational floats adapted to assist in moving the dock out of the water; and U.S. Pat. No. 2,924,191 which discloses modular sections supported by a beam type understructure.

It now has been found that a unibody construction comprising a longitudinal box beam understructure welded to a rigid flotation unit and supporting deck planking secured to the box beam on a diagonal with the longitudinal dimension of the box beam member eliminates the necessity for transverse reinforcing or bracing members for the dock understructure and further improves the overall strength and stability of the floating dock unit. The integral structure of the box beam and the flotation unit substantially increases the overall structural strength of the dock unit, minimizes torsional stress and strain, and resists vertical and horizontal bending movements. The diagonally secured deck planks further increase and reinforce the shear and torsional resistance of the dock unit. The dock units can further be pivotally interconnected linearly in tandem to provide a stabilized extended floating dock system. These and other advantages of this invention will become more apparent by referring to the drawings and the detailed description of the invention.

SUMMARY OF THE INVENTION

Briefly, the floating dock unit of this invention comprises a unibody understructure including a longitudinal box beam member secured to a flotation unit as a unitary understructure unit. Surface deck plants are secured to the longitudinal box beam diagonally to the longitudinal dimension of the box beam. Two or more dock units cam be pivotally interconnected to provide a floating dock system.

IN THE DRAWINGS

FIG. 1 is a top plan view of a floating dock unit in accordance with this invention and is shown pivotally interconnected to a second floating dock unit;

FIG. 2 is a side elevational view of the floating dock unit of FIG. 1 and is shown pivotally connected with a ramp unit.

DETAILED DESCRIPTION OF THE INVENTION

Figure 3:
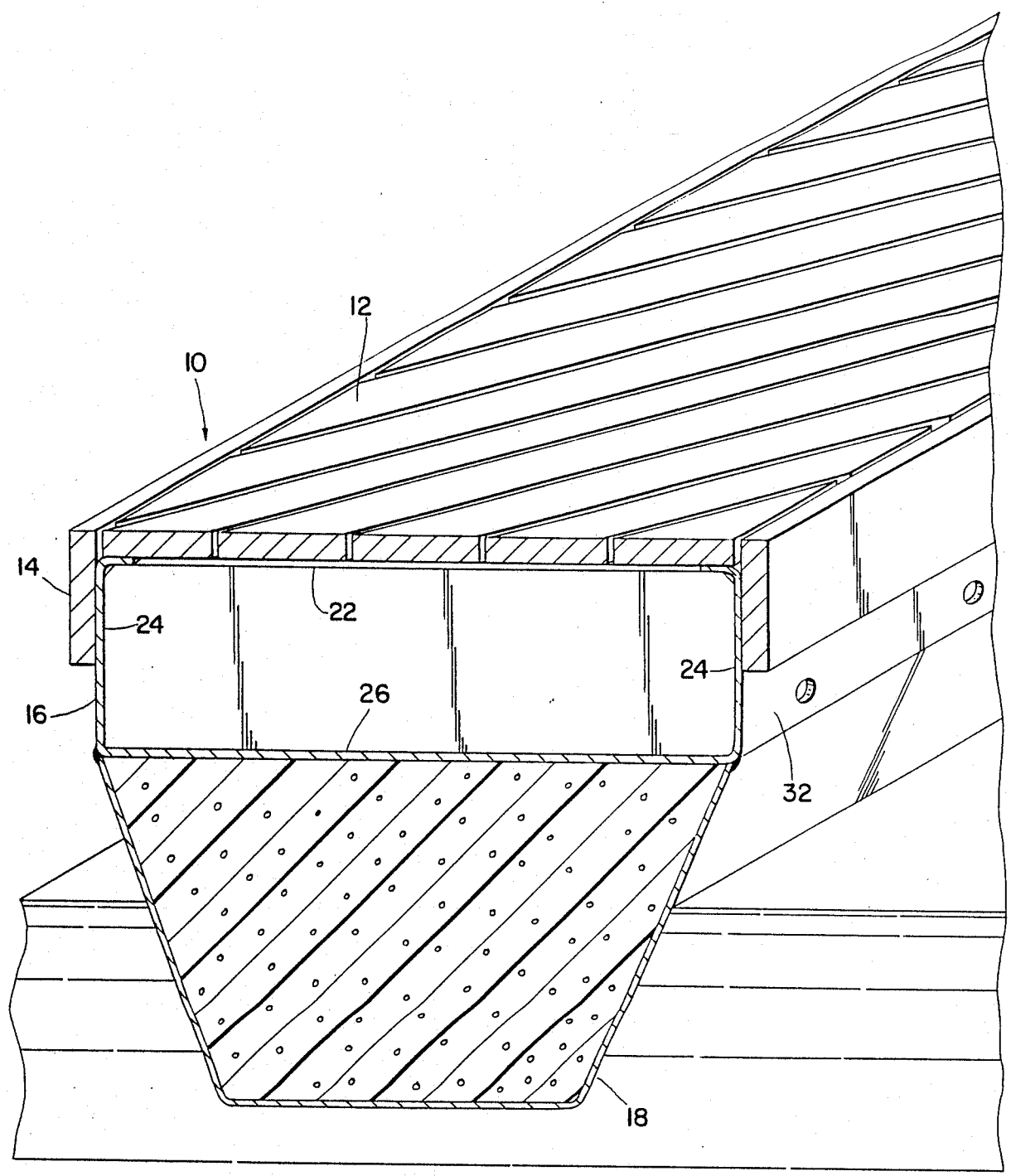
FIG. 3 is a sectional perspective view taken along lines 3—3 in FIG. 2.

Referring now to the drawings wherein like reference characters designate like parts, at 10 is shown a floating dock unit having an upper deck surface consisting of a plurality of diagonally orientated deck planks 12 secured to a hollow longitudinal box beam member 16 and supported by and secured to a flotation unit 18 welded or otherwise secured to the bottom of the longitudinal box beam member 16.

As viewed in FIG. 1, two or more floating dock units 10 are pivotally interconnected by a pivot connection 15 interconnecting pivot brackets 17 secured to the box beam member 16 on adjacent floating dock units 10. Each dock unit 10 contains side planks 14 secured to the sides of the box beam member 16. One of the floating dock units 10 contains an end plank 13 secured across the end of the respective box beam member 16. The top planks 12, the side planks 14, and the end plank 13 are preferably constructed of wood, such as pine, or metal extrusions, such as aluminum.

FIG. 2 is a side elevational view of the floating dock 10 shown in FIG. 1 but includes a ramp unit 21 illustrated on the left of the drawing and the dock lacks a flotation unit thereon wherefor the ramp unit 21 functions as an entrance ramp 21 for the floating dock system. The entrance ramp 21 is pivotally connected to the adjacent dock unit 10 by a pivotal connection of adjacent pivot brackets 17 and suitably can provide an entrance ramp from dry ground or from some other satisfactory structure or between two floating dock units 10 if desired.

Referring now to FIG. 3, which illustrates the longitudinal box beam 16 in greater detail, the beam comprising an inverted C-shaped channel having a bottom wall 26 disposed between upright side walls 24 and has a top wall plate 22 welded or otherwise secured between the two side walls 24. The hollow box beam member 16 further contains a plurality of longitudinally spaced openings or weep holes 32 in each side wall 24 to permit free passage of air between the inside and the outside of the box beam member 16. The longitudinal box beam member 16 further supports a deck comprising a plurality of top deck planks 12 diagonally orientated relative to the longitudinal direction of the box beam 16 and at an angle preferably between about 25° and 65° relative to the longitudinal line of the box beam member 16. The diagonal orientation should preferably be approximately 45° to the longitudinal orientation of the box beam 16 for maximum structural strength.

The box beam structure 16 as shown is supported in water by a unitary metal flotation unit or pontoon 18 integrally welded or otherwise secured to the bottom wall 26 of the box beam 16. The flotation unit 18 can be filled with air or with a rigid plastic foam such as polyethylene, polypropylene, polyurethane or polystyrene to provide structural rigidity and integrity to the flotation unit 18 as well as to the overall floating dock unit 10. The flotational unit 18 preferably has an inverted trapezoidal transverse cross-section with the bottom base line being relatively shorter than the top base line secured to the box beam 16, whereby the longitudinal sides of the flotation unit 18 are angled inwardly from top to bottom. Preferably the trapezoidal cross-section is symmetrically disposed with respect to a vertical centerline through the trapezoid. Accordingly, the inwardly angled sides of the flotation unit 18, in conjunction with being integrally welded to the bottom wall 26 of the box beam 16, provides considerable balance and substantially increases the structural strengths of the floating dock unit 10. The unitary construction of the flotation unit 18 and the box beam 16 further provides considerable resistance to torsional stresses and strains, as well as to horizontal and vertical bending movements within the dock unit 10. The diagonal top planks 12 secured on the diagonal to the longitudinal box beam member also increase the structural integrity of the box beam understructure 16 further negating the need for understructure trusses or cross-member bracing.

In use, individual floating dock units 10 can be easily transported to bodies of water for use or removed from the water for storage if desired. Individual floating dock unit 10 can be inter-connected linearly in tandem to provide a dock system having connecting adjacent dock units 10 with pivotal connections 15 and pivot brackets 17. A shorter entrance ramp 21 can be similarly connected to provide a ramp from the dock system to dry ground.

Although preferred embodiments have been described and illustrated in the drawings, the floating dock unit of this invention is not intended to be limited thereby except by the appended claims.

What I claim is:

1. A floating dock unit comprising:
    a unibody construction consisting of a hollow longitudinal box beam member, a rigid flotation unit, and a top surface deck where the flotation unit and surface deck are secured on a level with the box beam member;
    the box beam member comprising an upper wall, a lower wall, and a pair of laterally spaced upright side walls secured together to provide the longitudinal box beam member;
    the flotation unit having a transverse cross-section of an inverted trapezoid with a top base line of a length at least equal to the lower wall of the box beam member to which it is integrally secured and adapted to support the floating dock unit in water;
    the top surface deck comprising a plurality of planks secured to the upper wall of the longitudinal box member, said planks secured diagonally relative to the longitudinal dimension of the box beam member, where the bos beam member and the flotation unit and the top surface deck form an integral structural unit.

2. The floating dock unit in claim 1 where the deck comprising a plurality of diagonally secured planks where said planks are secured at an angle between about 25° and 65° relative to the longitudinal dimension of the longitudinal box beam.

3. The floating dock unit in claim 1 where the diagonal angle is about 45°.

4. The floating dock unit in claim 1 where the flotational unit is a single pontoon secured to the bottom wall of the box beam member in a unitary construction.

5. The floating dock unit in claim 1 where the flotational unit has a transverse cross-section of an inverted trapezoid with the transverse bottom base length shorter than the top base length secured to the box beam member.

6. The floating dock unit in claim 1 where the flotational unit contains rigid polymeric foam.

7. The floating dock unit in claim 1 where the hollow longitudinal box beam comprises an inverted C-shaped beam having an intermediate bottom wall disposed between laterally spaced upright side walls, and a top wall is welded between said spaced upright side walls to provide a box beam construction.

8. The floating dock unit in claim 1 where the longitudinal box beam member comprises a pair of laterally spaced side walls, and at least one of the side walls contains a plurality of longitudinally spaced air holes to provide air passage between the inside and outside of the box beam member.

9. The floating dock unit in claim 8 where both side walls of the box beam member contain longitudinally spaced air holes.

10. The floating dock unit in claim 1 where one or more other floating dock units are interconnected linearly in tandem to provide a floating dock system.

11. The floating dock system in claim 10 where the floating dock units are pivotally interconnected.

12. The floating dock unit in claim 1 where an entrance ramp is pivotally interconnected to one end of the floating dock unit.

* * * * *

UNITED STATES PATENT AND TRADEMARK OFFICE
CERTIFICATE OF CORRECTION

PATENT NO. : 4,803,943
DATED : February 14, 1989
INVENTOR(S) : Reg D. Corbett

It is certified that error appears in the above-identified patent and that said Letters Patent is hereby corrected as shown below:

Column 1, line 59, "plants" should be ---planks---;

Column 4, line 5, "bos" should be ---box---.

Signed and Sealed this

Twelfth Day of September, 1989

Attest:

DONALD J. QUIGG

Attesting Officer     Commissioner of Patents and Trademarks